US009026558B2

(12) United States Patent
Dunkle (10) Patent No.: US 9,026,558 B2
(45) Date of Patent: May 5, 2015

(54) COMMUNICATIONS INTERFACE DATABASE FOR ELECTRONIC DIAGNOSTIC APPARATUS

(75) Inventor: Mark Vandevert Dunkle, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1158 days.

(21) Appl. No.: 11/904,857

(22) Filed: Sep. 28, 2007

(65) Prior Publication Data

US 2008/0126423 A1 May 29, 2008

Related U.S. Application Data

(63) Continuation of application No. 10/617,901, filed on Jul. 10, 2003, now abandoned.

(60) Provisional application No. 60/451,301, filed on Mar. 1, 2003.

(51) Int. Cl.
*G06F 7/00* (2006.01)
*G06F 17/30* (2006.01)
*G05B 19/418* (2006.01)

(52) U.S. Cl.
CPC .. *G05B 19/4183* (2013.01); *G05B 2219/31323* (2013.01)

(58) Field of Classification Search
CPC .............. G05B 19/4183; G05B 2219/31323
USPC ......... 707/802; 700/26, 73, 108, 121; 702/85, 702/108, 188
See application file for complete search history.

(56) References Cited

U.S. PATENT DOCUMENTS

| 4,841,456 | A | 6/1989 | Hogan, Jr. et al. |
| 5,105,438 | A | 4/1992 | Ackroff et al. |
| 5,528,510 | A | 6/1996 | Kraft |
| 5,587,930 | A | 12/1996 | Hori et al. |
| 5,668,745 | A | 9/1997 | Day |
| 5,745,268 | A | 4/1998 | Eastvold et al. |
| 5,777,876 | A | 7/1998 | Beauchesne |
| 5,778,049 | A | 7/1998 | Young et al. |
| 5,845,234 | A | 12/1998 | Testa et al. |

(Continued)

FOREIGN PATENT DOCUMENTS

| EP | 1 150 187 A | 10/2001 |
| JP | 06-168863 | 6/1994 |

(Continued)

OTHER PUBLICATIONS

Brookside Software, "Brookside Software, A Corporate Overview," Jan. 23, 1998, 23 pages, USA.

(Continued)

*Primary Examiner* — Shew-Fen Lin
(74) *Attorney, Agent, or Firm* — Blakely, Sokoloff, Taylor & Zafman LLP (57) ABSTRACT

A connection to an item of equipment is detected. An equipment class of the item of equipment is determined. A selection of an attribute associated with the item of equipment is received. An attribute record corresponding to the equipment class of the item of equipment and the selected attribute is retrieved from a database, wherein the attribute record enables a retrieval of a value of the selected attribute from the item of equipment.

19 Claims, 6 Drawing Sheets

(56) References Cited

U.S. PATENT DOCUMENTS

| | | | |
|---|---|---|---|
| 5,918,191 A * | 6/1999 | Patel | 702/84 |
| 5,953,684 A | 9/1999 | Alexander | |
| 6,046,986 A | 4/2000 | Glass, III et al. | |
| 6,047,293 A | 4/2000 | Blitz | |
| 6,061,685 A | 5/2000 | Fantenberg | |
| 6,070,188 A | 5/2000 | Grant et al. | |
| 6,128,588 A * | 10/2000 | Chacon | 703/6 |
| 6,134,674 A * | 10/2000 | Akasheh | 714/33 |
| 6,470,227 B1 * | 10/2002 | Rangachari et al. | 700/95 |
| 6,535,779 B1 | 3/2003 | Birang et al. | |
| 6,665,662 B1 | 12/2003 | Kirkwood et al. | |
| 6,697,750 B1 | 2/2004 | Coin et al. | |
| 6,820,076 B2 * | 11/2004 | Bailey et al. | 707/770 |
| 6,952,656 B1 | 10/2005 | Cordova et al. | |
| 6,980,959 B1 * | 12/2005 | Garrow et al. | 705/7 |
| 7,734,287 B2 * | 6/2010 | Ying | 455/423 |
| 2001/0043568 A1 | 11/2001 | Michale et al. | |
| 2001/0047283 A1 * | 11/2001 | Melick et al. | 705/8 |
| 2002/0035447 A1 * | 3/2002 | Takahashi et al. | 702/188 |
| 2002/0094696 A1 * | 7/2002 | Heyder et al. | 438/758 |
| 2002/0105355 A1 | 8/2002 | Floyd et al. | |
| 2002/0107581 A1 * | 8/2002 | Obradovic et al. | 700/1 |
| 2002/0116155 A1 * | 8/2002 | Mayer et al. | 702/188 |
| 2002/0180449 A1 * | 12/2002 | Ushiku et al. | 324/464 |
| 2002/0181405 A1 * | 12/2002 | Ying | 370/245 |
| 2002/0183977 A1 * | 12/2002 | Sui et al. | 702/188 |
| 2003/0046027 A1 * | 3/2003 | Kitamura et al. | 702/182 |
| 2003/0154192 A1 * | 8/2003 | Laborde et al. | 707/3 |
| 2003/0236628 A1 | 12/2003 | Martorana et al. | |
| 2005/0271132 A1 | 12/2005 | Kolenc et al. | |
| 2006/0167643 A1 * | 7/2006 | Casto et al. | 702/85 |

FOREIGN PATENT DOCUMENTS

| | | |
|---|---|---|
| JP | 10-304008 | 11/1998 |
| WO | WO 02/066923 A | 8/2002 |
| WO | WO 2004/079465 A1 | 9/2004 |

OTHER PUBLICATIONS

Courcy, S., et al., "Advanced hardware and software techniques for third generation field portable ATE," 1982 IEEE International Automatic Testing Conference, Oct. 12, 1998, pp. 286-290, USA.

Cundiff, Patricia A., et al., "An Embedded Expert System for Portable ATE," Autotestcon '88 Symposium Proceedings, Oct. 4, 1988, pp. 155-159, USA.

MKS Instrucments, Inc. "Blue Box Communications Manager" 4 pp, USA, 2002.

MKS Instrucments, Inc. "EASI OEE," 4 pages, USA, 2002.

Noonen, Dan et al. "DeviceNet Application Protocol" 1st International Can Conference, 'Online! 1994, XP002284232, Retrieved on Jun. 6, 2004 from the Internet: http://212.114.788.132/icc/proceedings.html.

Parker, Les, et al., "Universal pin electronics in portable testers," Autotestcon '88 Symposium Proceedings, Oct. 4, 1988, pp. 165-168, USA.

PCT International Preliminary Report on Patentability and Written Opinion for International Application No. PCT/US2004/003595, mailed Jul. 1, 2004, 11 pages.

PCT International Search Report and Written Opinion for International Application No. PCT/US2004/003595, mailed Sep. 15, 2005, 10 pages.

Applied Materials Software Office Action for U.S. Appl. No. 10/617,901 mailed Dec. 10, 2008.

Applied Materials Software Office Action for U.S. Appl. No. 10/617,901 mailed Jul. 1, 2008.

Applied Materials Software Office Action for U.S. Appl. No. 10/617,901 mailed Dec. 7, 2007.

Applied Materials Software Office Action for U.S. Appl. No. 10/617,901 mailed May 21, 2007.

Applied Materials Software Office Action for U.S. Appl. No. 10/617,901 mailed Sep. 26, 2006.

Applied Materials Software Office Action for U.S. Appl. No. 10/617,901 mailed Feb. 10, 2006.

Applied Materials Software Office Action for U.S. Appl. No. 10/617,901 mailed Oct. 16, 2009.

Applied Materials Software Office Action for U.S. Appl. No. 10/617,901 mailed Apr. 12, 2010.

First Office Action for Chinese Application No. 200480008110.7 dated Nov. 30, 2007, 30 pages.

Advisory Action for U.S. Appl. No. 10/617,901 dated Feb. 22, 2007, 3 pages.

Advisory Action for U.S. Appl. No. 10/617,901 dated Apr. 1, 2008, 3 pages.

* cited by examiner

Fig. 1

| UUT Class | | Attribute | | | ID | Interface & Protocol | Conversion | | | Read/Write |
|---|---|---|---|---|---|---|---|---|---|---|
| Model | Version | Attribute Name | Chamber Position | Chamber Model or Config | | | Units | Scale Factor | | |
| | Version, First | Version, Last | | | | | | | Min | Max |

Fig. 2

| Model | Version, First | Version, Last | Attribute Name | Chamber Position | ID |
|---|---|---|---|---|---|
| Alpha | 1 | 7 | Pressure | 1 | 33 |
| Alpha | 8 | 16 | Pressure | 1 | 44 |
| Alpha | 17 | 20 | Pressure | 1 | 33 |

Fig. 3

| Model | 1-Version, First | 1-Version, Last | 2-Version, First | 2-Version, Last | Attribute Name | Chamber Position | ID |
|---|---|---|---|---|---|---|---|
| Alpha | 1 | 7 | 17 | 20 | Pressure | 1 | 33 |
| Alpha | 8 | 16 | | | Pressure | 1 | 33 |

Attribute table

```
ID   (KEY)

Interface & Protocol

UUT: Model
UUT: Version, First
UUT: Version, Last

Attribute: Name
Attribute: Chamber Position
Attribute: Chamber Model or Config

Read/Write

Conversion: Units
Conversion: Scale Factor: Min
Conversion: Scale Factor: Max
```

*Fig. 7*

Attribute table

```
ID   (KEY)

Interface & Protocol

UUT: Model
UUT: Version, First
UUT: Version, Last

Attribute: Chamber Position
Attribute Name & Chamber Config Key
```

*Fig. 8*

Attribute Name & Chamber Config table

```
Attribute Name & Chamber Config Key

Attribute: Name
Attribute: Chamber Model or Config

Read/Write

Conversion: Units
Conversion: Scale Factor: Min
Conversion: Scale Factor: Max
```

COMMUNICATIONS INTERFACE DATABASE FOR ELECTRONIC DIAGNOSTIC APPARATUS

RELATED APPLICATIONS

This patent application is a continuation application of U.S. patent application Ser. No. 10/617,901 filed on Jul. 10, 2003 now abandoned, which claims the benefit under 35 U.S.C. §119(e) of U.S. Provisional Patent Application No. 60/451,301 filed Mar. 1, 2003.

FIELD OF THE INVENTION

The invention relates generally to electronic diagnostic or data acquisition apparatus. More specifically, the invention is an improvement to such diagnostic apparatus comprising database methods and apparatus for tabulating various models or classes of equipment ("unit under test" or "UUT") that can be tested and, for each such class of UUT equipment, tabulating: (1) each diagnostic attribute whose value can be transmitted by that UUT; and (2) the ID (e.g., physical signal line, physical address, or logical address) and other communications interface parameters required for a diagnostic apparatus to retrieve the value of that attribute from that UUT.

BACKGROUND OF THE INVENTION

Diagnostic apparatus, also called data acquisition or data collection apparatus, is commonly used to test and troubleshoot various types of electronic equipment. The diagnostic apparatus monitors the values of electrical data generated by the electronic equipment under test ("unit under test" or "UUT"). This data generally represents various sensor measurements and/or operating conditions of the UUT, all of which are collectively referred to as "diagnostic attributes," "collectible attributes," or simply "attributes" of the UUT. Maintenance personnel analyze the attribute data to troubleshoot or optimize the performance of the UUT.

Maintenance personnel typically are assigned to test and troubleshoot a variety of types of such electronic equipment. Different types and models of UUT equipment generally impose different interface requirements for connection to a diagnostic apparatus, because they differ from each other regarding the number and kind of data communications interfaces, the attributes they output at the data interfaces, and the ID's (physical signal line, physical address, or logical address) required for a diagnostic apparatus to retrieve the values of selected attributes from the UUT. In fact, different interface requirements may even exist among different production versions of the same model of equipment.

Some conventional diagnostic apparatuses are adapted to interface with only a narrow range of UUT equipment models. Other conventional diagnostic apparatuses are programmable to enable them to interface with a broader range of UUT equipment, but such programming must be manually entered by the maintenance personnel each time the apparatus is intended to be connected to a different model of UUT.

A need exists for a diagnostic apparatus capable of interfacing with a broad range of UUT equipment models without requiring manual reprogramming by maintenance personnel.

DETAILED DESCRIPTION OF THE PREFERRED EMBODIMENTS

Conventional UUT and Diagnostic Apparatus

Before describing the novel diagnostic apparatus and database, it will be helpful to describe how UUT's generally communicate with conventional diagnostic apparatuses.

Figure 1:
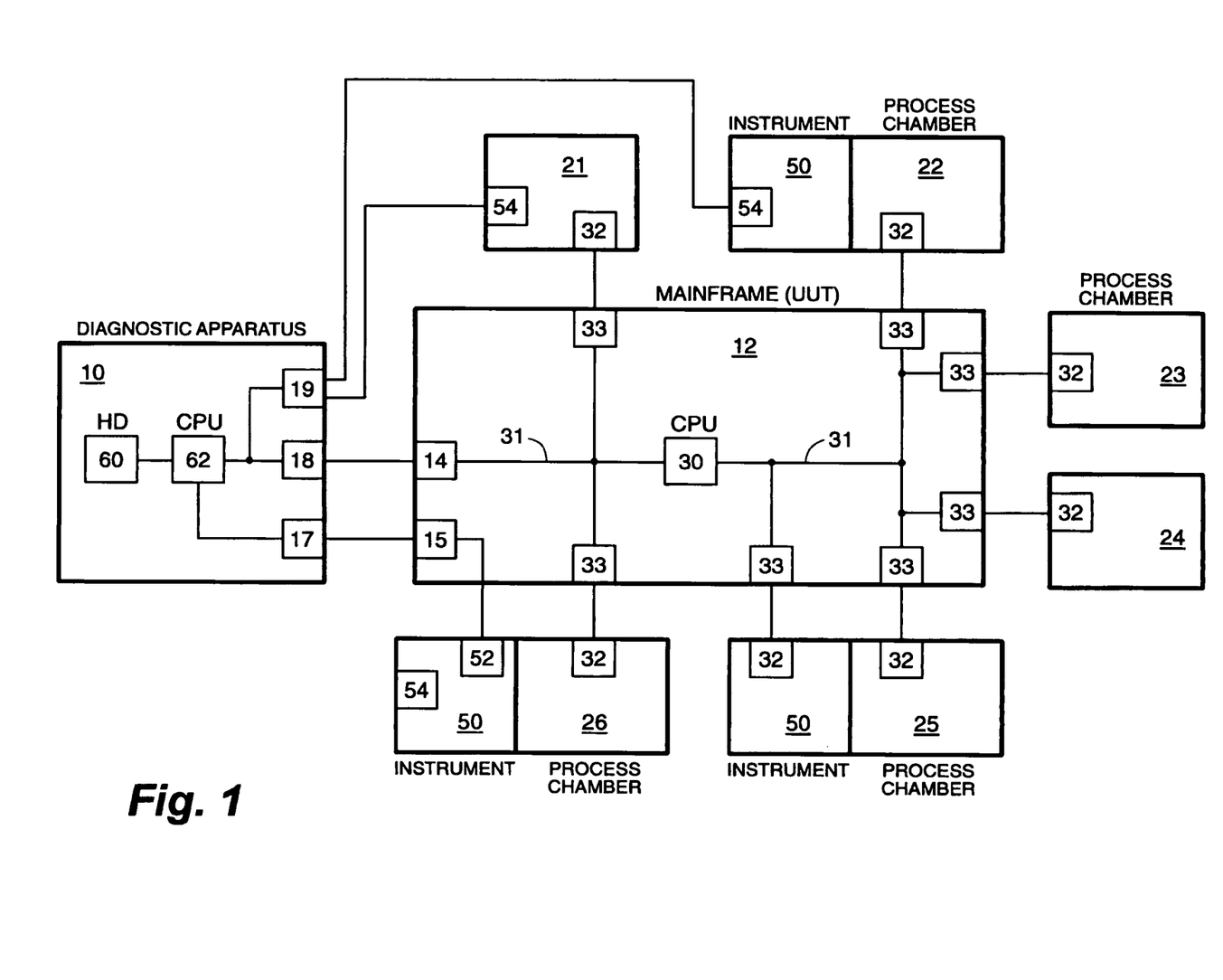
FIG. 1 is a schematic diagram of the diagnostic apparatus of the invention connected to a conventional UUT which is a semiconductor manufacturing mainframe having six process chambers.

While the UUT ("unit under test") can be any type of electronic equipment, the exemplary UUT 12 shown in FIG. 1 is similar to a semiconductor fabrication equipment "mainframe" or "platform" commercially sold as the Precision 5000 model by Applied Materials, Inc., the assignee of the present invention. The illustrated mainframe is designed to integrate up to six process chambers 21-26 which perform various semiconductor fabrication processes. For example, three chambers 21, 22, 23 can be plasma chemical vapor deposition (CVD) chambers, one chamber 24 can be a heating chamber, and two chambers 25 and 26 can be plasma etch chambers.

(An actual Precision 5000 includes various components that are omitted here to simplify the illustration, such as loadlock chambers for receiving semiconductor wafers from a carrier outside the mainframe and a wafer transfer robot for transferring wafers between chambers.)

One of the functions of the UUT mainframe 12 is to provide a central communications interface or communications bus 31 for the chambers. Each chamber has a data port 32 connected to a corresponding internal data port 33 of the mainframe. The mainframe's internal data ports 33 may all be connected to a common communications channel 31. The mainframe includes a computer processor (CPU) 30 that controls the sequence and operating conditions of the semiconductor fabrication processes performed in the process chambers and controls data transfer among all of the mainframe's internal and external data ports. The mainframe can transmit data through its internal data ports to the chambers so as to set the values of various chamber operating parameters, such as chamber pressure, pedestal temperature, and RF power.

Each of the chambers also can be fitted with sensors or measurement instruments 50 to measure operating conditions in the chamber, such as gas pressure, RF reflected power, or the intensity of optical emissions at certain wavelengths. The mainframe can include additional internal data ports 52 to receive measurement values from the measurement instruments and to send commands for controlling the measurement instruments.

The diagnostic attributes or collectible attributes of the UUT 12, referred to herein simply as "attributes," include all the operating conditions and measurement values described in the two preceding paragraphs. Specifically, the "attributes" of the UUT 12 are defined as the set of operating conditions and sensor measurements whose values can be outputted by the UUT, by the chambers 21-26 or other apparatus connected to the UUT, or by the measurement instruments 50 connected to the chambers or the UUT. The attribute values outputted by the UUT or any of the chambers or instruments attached to the UUT are collectively referred to as "attribute data".

The UUT 12 has at least one external communications interface or I/O (input/output) port through which it can transmit attribute data to an external device such as a factory controller computer or a diagnostic apparatus 10. Generally the principal external communications interface is a digital interface 14 such as a conventional RS-232 serial port or a conventional Ethernet port. The UUT also may have one or more analog communications interfaces 15, typically for the purpose of outputting measurement values from measurement instruments 50 that produce analog output signals 52.

A conventional diagnostic apparatus 10 intended to monitor a given type of UUT will have one or more communications interfaces (I/O ports) compatible with, and capable of electrical connection to, the external communications interfaces of that type of UUT. For example, to connect to the exemplary UUT, a diagnostic apparatus should have a digital communications interface 18 and one or more analog communications interfaces 17 respectively connected to the UUT's digital interface 14 and analog interfaces 15. (For purposes of illustration, the UUT in FIG. 1 includes analog interfaces, whereas the commercially sold Precision 5000 mainframe does not include an analog interface.)

In addition, some process chambers and some measurement instruments may output attribute data via digital or analog communications interfaces 54 that are not connected to the UUT. To receive this attribute data, the diagnostic apparatus 10 may include additional communications interfaces 19 connected to the communications interfaces 54 of the chambers and measurement instruments.

Because attribute data may be outputted by a UUT, by a chamber or other apparatus connected to the UUT, or by a measurement instrument coupled to such a chamber or to the UUT, the term "attribute data source" or simply "data source" is used herein to refer to any apparatus connected directly or indirectly to the UUT that can output attribute data. Furthermore, all references herein to attribute data outputted by a UUT are intended to include attribute data outputted by any attribute data source connected directly or indirectly to that UUT.

The numerous conventional digital communications protocols by which a UUT or other attribute data source can output digital data through an external communications interface generally fall within either of two categories: command-driven protocols and continuous streaming protocols.

In a command-driven protocol, the data source outputs attribute data only in response to "read" commands received by the data source at its digital communications interface. Specifically, a diagnostic apparatus 10 can receive from the data source the value of a particular attribute only by transmitting to the digital I/O interface 14 or 54 of the data source a "read" command that includes the ID of that attribute. The ID, also called a logical address or logical port, is a digital value by which a UUT, or its associated attribute data source, uniquely identifies each attribute it is capable of outputting. By "logical" we mean that the ID need not correspond to any physical address or physical port.

Besides responding to "read" commands, some attribute data sources also respond to "write" commands via the digital I/O interface 14 or 54. For example, a diagnostic apparatus or factory controller computer can send commands to the UUT that change the operating parameters of the chambers.

In a continuous streaming communications protocol for outputting digital data, a UUT or other data source outputs a continuous stream of attribute data through its external digital communications interface 14 or 54. The attribute data typically is formatted as periodically transmitted frames, where each frame of data contains the current value of every attribute. In some data source apparatuses, each attribute is identified simply by its sequential position or offset in the frame. In that case, the ID or logical address of each attribute would be its position or offset. In other data sources, the frame may include an ID field associated with each attribute field. The ID value transmitted in the ID field identifies the attribute whose value is transmitted in the associated attribute field.

In a variant of the continuous streaming protocol, often called "trace mode" protocol, a UUT or other attribute data source only outputs the values of certain attributes in a continuous streaming format. A diagnostic apparatus can select which attributes are included in the "stream" by sending "trace mode" commands to the data source which identify the selected attributes.

Semiconductor fabrication equipment that implements the published data communications standard known as SECS-2 generally can output attribute data using both a command-driven protocol and a trace mode protocol.

Regardless of whether the UUT and its associated attribute data sources transmit digital attribute data via a command-driven protocol, a continuous protocol, or both, it is important for the diagnostic apparatus 10 to know the ID corresponding to each diagnostic attribute for every class of UUT with which the diagnostic apparatus will be used.

As stated above, the UUT or its associated attribute data sources also may have one or more analog communications interfaces 15 for outputting measurement values from measurement instruments or sensors that produce attribute data in the form of analog output signals. Each analog interface may have one or more signal lines that can each transmit the analog value of a different attribute. In that case, it is important for the diagnostic apparatus to know which attribute corresponds to (i.e., is transmitted by) each signal line of each analog interface.

Various mainframe models differ in the number of process chambers to which they can be connected. In mainframes 12 to which multiple chambers 21-26 can be connected, it is important to identify which chamber a given attribute value applies to. Accordingly, a given class of diagnostic attribute has a different ID for each chamber. An example of a "class" of attribute is chamber pressure. The chamber pressure in the first chamber 21 and the chamber pressure in the second chamber 22 would be distinguished by having different ID's.

Various process chamber models have different classes of attributes. For example, RF power is an attribute of a plasma chamber but not a thermal deposition chamber, whereas heat lamp power typically is an attribute of the latter but not the former. As another example, some plasma chambers have two RF power supplies with independently controllable powers and RF frequencies, while other plasma chambers have only one RF power supply.

Various mainframe models also have different classes of attributes that relate to the mainframe itself rather than to one of the process chambers and that can be received or transmitted at the external communications interface of the mainframe. An example of a mainframe attribute is the position of a wafer transfer robot. Some mainframe models have only one robot while others have two, hence the former mainframes would not accept commands to control the position of a second robot or the pressure within the transfer chamber housing the second robot.

Even to the extent that different UUT or mainframe models have common attributes, such as chamber pressure and susceptor temperature, different mainframe models typically assign different ID's to those attributes. For example, for one mainframe model the chamber pressure in process chamber number one may have an ID of "12345", whereas the corresponding chamber pressure may have an ID of "ABC" for a second mainframe model. Furthermore, those UUT's that have multiple external communications interfaces may differ in the correspondence between attributes and interfaces, i.e., for each diagnostic attribute, which interface and which signal line on that interface transmits that attribute.

UUT's also differ in the format in which they encode the attributes. For example, they may differ in terms of the conversion factors required to convert the digital values which they transmit via their external communications interface to physical attributes such as temperature and pressure.

Because of the many differences among classes of UUT's as just described, a conventional diagnostic apparatus typically is limited to receiving data from one model, or a small number of models, of UUT for which the diagnostic apparatus understands how to retrieve the attributes.

Attribute Database

My novel diagnostic apparatus 10 adds to the conventional diagnostic apparatus described above a novel database containing communications interface specifications enabling the diagnostic apparatus 10 to communicate with many different classes (models and/or versions) of UUT's 12. The database contains a table, referred to herein as the "attribute table" or "attribute database", that stores a list of the attributes that each class of UUT can output via its external communications interface. For each attribute, the attribute database stores the ID that enables the diagnostic apparatus to retrieve the value of that attribute.

The diagnostic apparatus can be conventional in every respect except for the inclusion of the attribute database. As described below under the heading "Hardware Implementation," the database can be stored on any conventional data storage device 60, which can be located within the diagnostic apparatus or can be located remotely and connected to the diagnostic apparatus via a communications network.

Figure 2:
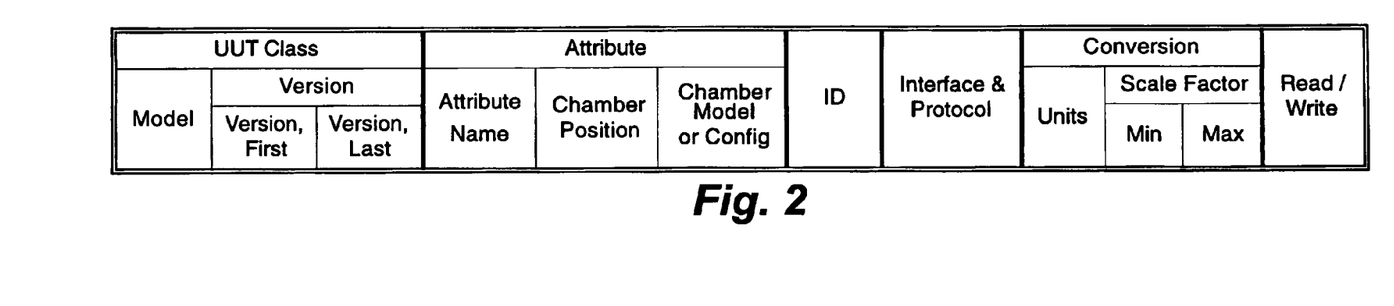
FIG. 2 is a schematic diagram of the fields in an attribute record of an attribute database according to a preferred embodiment of the invention. Subordinate fields are depicted below the compound field to which they belong.

In the embodiment illustrated in FIG. 2, the attribute database contains a distinct database record for each combination of UUT class and attribute. That is, the attribute database contains a distinct group (i.e., "set") of records for each class (model or version) of UUT equipment, and the set of records for a given mainframe class includes a distinct record for each attribute that can be transmitted to or received from that mainframe class. (Alternative embodiments for reducing the required number of records are described below under the headings "Version Ranges" and "Database Normalization".)

As described above, if the UUT is a mainframe apparatus designed to be connected to various classes of process chambers 21-26 and/or measuring instruments, the diagnostic attributes can include attributes outputted by the mainframe itself, by the various classes of process chambers that can be attached to that mainframe, and by the various instruments that can be coupled to that mainframe or its process chambers, all of which are collectively referred to as "data source apparatuses".

Each record stored in the attribute database is referred to herein as an "attribute record". FIG. 2 shows the data fields that preferably are included in the attribute database. The left-to-right order of the illustrated fields is arbitrary; the fields can be stored within each database record in any physical or temporal order.

In the embodiment shown in FIG. 2, each attribute record includes every field. Alternative embodiments that use multiple, related database tables to reduce entry of redundant data in the attribute records are described below, under the heading "Database Normalization."

"UUT Class" Field

The "UUT Class" field of each attribute record identifies the class of equipment to which the remaining fields in the record pertain. The attribute database can be used to store information about many different models of UUT's, where each model can have various versions. Accordingly, in the preferred embodiment, the "UUT Class" field has two subordinate fields called "Model" and "Version". The value stored in the "Model" field identifies an individual equipment model, and the value stored in the "Version" field identifies a specific version of the equipment model specified in the "Model" field.

Any of the fields in an attribute record can be either a simple field that stores a single value or a "compound field" that stores a plurality of values. We define a "compound field" as a plurality of fields, which we call "subordinate fields" or "sub-fields", whose respective values collectively specify the value of the parameter represented by the compound field. For example, the "UUT Class" field described in the preceding paragraph is a compound field. The UUT Class is completely and uniquely identified by designating an equipment model in the "Model" sub-field and designating a version of that model in the "Version" sub-field.

A subordinate field can itself be a compound field; that is, a subordinate field can include a plurality of further subordinate fields. For example, as described below under the heading "Version Ranges", the "Version" field can include "Version, First" and "Version, Last" sub-fields enabling the "Version" field to identify a range of equipment versions instead of a single version.

As described below under the heading "Database Normalization," the sub-fields of a given compound field can be stored in different, related database tables, but still are considered sub-fields of the same compound field for purposed of this patent specification.

"Attribute" Field

The "Attribute" field contains the name of the diagnostic attribute whose ID and other properties (e.g., physical units and conversion factors) are described by the remaining fields of the attribute record. As stated above, diagnostic attributes of a UUT include all sensor measurements and operating conditions of the UUT and of all chambers, measuring instruments and other apparatus attached directly or indirectly to the UUT. The attribute database includes a separate attribute record for each diagnostic attribute that the class of UUT identified in the "UUT Class" field is capable of outputting.

For classes of UUT's that are mainframes 12 designed to connect to multiple chambers 21-26 as shown in FIG. 1, it is important to identify which chamber a given attribute value applies to. Typically, the mainframe will assign different ID's to distinguish the same attribute from different chambers.

Since an attribute that relates to a chamber is uniquely specified only if both the attribute name and the chamber position are specified, the "Attribute" field in an attribute record for a chamber-related attribute should include two subordinate fields, a "Attribute Name" field and a "Chamber Position" field, as shown in FIG. 2. For every chamber-related attribute, the database should include a separate record for each chamber position on the mainframe. This enables the attribute database to store (in the "ID" field of each record) the unique ID assigned by the mainframe to each attribute associated with each chamber position.

Conversely, if the attribute specified in the "Attribute" field relates to the mainframe itself rather than to one of the chambers connected to the mainframe, the "Chamber Position" field has no relevance, so the "Chamber Position" field can be omitted, or else the value of the field can be set to zero or empty.

For example, one model of mainframe 12 may be capable of attachment to up to six process chambers as shown in FIG. 1. Suppose that one of the measured attributes for each chamber is the pressure within that chamber. In that case, the Attribute Name of "pressure" will not completely and uniquely identify a single diagnostic attribute. Instead, a complete identification of a "pressure" attribute would have to specify the Chamber Position, such as "pressure in chamber 1", "pressure in chamber 2", etc. Generally, the mainframe will assign six distinct ID's to be used by a diagnostic apparatus to retrieve the pressure measurement for the respective six chambers. These ID's will be stored in the database in the form of six distinct database records, where each record has the same name "pressure" stored in the "Attribute Name" field but has a distinct one of the values 1 through 6 in the "Chamber Position" field and has the corresponding one of the six ID's in the "ID" field.

In many cases, the "Attribute" field requires one or more additional sub-fields because the Attribute Name and Chamber Position do not suffice to uniquely determine the ID required to retrieve the attribute. FIG. 2 illustrates that one possible additional sub-field is "Chamber Model". As described above under the heading "Conventional UUT and Diagnostic Apparatus," the mainframe UUT 12 shown in FIG. 1 can be connected to several different types of chambers, such as plasma CVD chambers 21-23, heating chamber 24, and plasma etch chambers 25, 26. Furthermore, a given chamber type generally may be available in several different models. For example, Applied Materials commercially sells different models of plasma etch chambers under the model names "MxP", "MxP+", and "Super-e". The "Chamber Model" field should store sufficient information to identify the chamber type and model, such as "MxP Etch".

Although some classes of diagnostic attributes are shared by these different chamber types and models, different chamber models often will not assign the same ID to a given diagnostic attribute. For example, the ID required to retrieve the cathode temperature may be "123" for a model MxP attached to the mainframe at chamber position 6 and "456" for a model "Super-e" chamber at the same position. In this example, therefore, the three sub-fields "Attribute Name", "Chamber Position", and "Chamber Model" are required to completely and uniquely identify a diagnostic attribute, such as "cathode temperature in an MxP Etch chamber at position 6", which would be represented by an attribute record in which the values stored in these three respective fields would be "cathode temperature", "6", and "MxP Etch", respectively.

FIG. 2 labels the "Chamber Model" sub-field as "Chamber Model or Config" to denote that one or more other parameters representing the configuration of the UUT or the chamber can be substituted for the Chamber Model in this field.

For classes of UUT's that have only a single, permanent process chamber, such as ion implant machines, the "Attribute" field need not include any sub-fields. In that case, the "Attribute" field should perform the same function as the previously described "Attribute Name" sub-field, i.e., it should store the name or description of the diagnostic attribute whose properties are described by the remaining fields of the attribute record.

Each attribute record optionally may further include a "Read/Write" field as shown in FIG. 2. This field may be used to store a logical "flag" that indicates whether the diagnostic attribute specified in the "Attribute" field: (1) can be read (i.e., retrieved or collected) but not modified by a diagnostic apparatus; (2) can be read and modified (i.e., "written"); or (3) can be modified but not read.

"Interface & Protocol" Field

As shown in FIG. 2, each attribute record preferably includes an "Interface & Protocol" field. If the UUT has more than one external communications interface 18 such that the different external interfaces output different diagnostic attributes, then the value stored in the "Interface & Protocol" field should identify which physical interface of the UUT outputs the diagnostic attribute specified in the "Attribute" field. Likewise, if the UUT can have chambers or instruments with external interfaces separate from those of the UUT, the "Interface & Protocol" field identifies which of these interfaces can output the attribute specified in the "Attribute" field.

The "Interface & Protocol" field preferably should identify the analog or digital hardware protocol and, optionally, the low level communications protocols by which the UUT outputs attribute data at the specified interface. Examples of hardware protocols that might be employed at different communications interfaces are RS-232 and Ethernet. Examples of communications protocols that different UUT's might employ are SECS, GEM, and IP. The "Interface & Protocol" field also can be used to specify the type of electrical connector used for that interface, such as DB 9, DB-25 or RJ-45. All the hardware and communications protocols mentioned in this paragraph are published standards.

The "Interface & Protocol" field can be omitted from the attribute database if all the UUT classes recorded in the database employ the same communications protocol for outputting attribute data, and if none of the UUT classes requires more than one external communications interface to output the attribute data.

The reason the interface and protocol are represented by a single field in FIG. 2 is that the communications protocols used at a given interface generally will be the same for all diagnostic attributes outputted at that interface. That is, a UUT or other data source would not employ different protocols for outputting different diagnostic attributes via the same interface. Therefore, there is no need to permit the interface and the protocols to be specified independently of each other in separate fields.

However, in actual programming of the database structure, it may be more convenient to divide the "Interface & Protocol" field into separate sub-fields for each level of hardware and communications protocol discussed in the preceding paragraph. A common practice in designing a relational database would be to define a "Interface & Protocol" table having separate fields for each of these protocol levels. The "Interface & Protocol" table should be "related" to the "Attribute" table shown in FIG. 2 via the "Interface & Protocol" field in the "Attribute" table.

"ID" Field

The "ID" field contains the ID that enables a diagnostic apparatus to retrieve (i.e., read or collect) the value of the diagnostic attribute identified by the "Attribute" field from the class of UUT equipment identified by the "UUT Class" field of the attribute record. As explained earlier, a UUT conventionally assigns a unique ID to every diagnostic attribute it can output from a given external communications interface.

The meaning of the ID depends on the type of communications interface and protocol employed by the UUT for outputting that diagnostic attribute. As just discussed, the communications protocol preferably is specified in the "Interface & Protocol" field.

If the "Interface & Protocol" field specifies an analog interface with multiple signal lines carrying different attribute data, the "ID" field should identify which signal lines (e.g., which pins on an electrical connector) carry the specified attribute.

If the "Interface & Protocol" field specifies a digital interface using a command-driven communications protocol, the "ID" field should specify the logical or physical address that must be included in a "read" command sent from the diagnostic apparatus to the UUT in order to retrieve the attribute specified in the "Attribute" field.

If the "Interface & Protocol" field specifies a digital interface using a continuously streaming communications protocol, the "ID" field should specify the logical or physical address transmitted by the UUT to identify the attribute data, or the logical address or offset that identifies the position of the specified attribute data within a "frame" of data that is periodically outputted by the UUT.

Hardware Implementation

As explained above, a UUT 12 has at least one external communications interface 14 through which it outputs attribute data. The diagnostic apparatus 10 should have a communications interface 18 compatible with, and connected to, the external communications interface 14 of the UUT. The diagnostic apparatus can have a number of communications interfaces of different types to permit connection to different types of interfaces on different classes of UUT's.

If the UUT 12 is a conventional semiconductor fabrication tool or mainframe, its external communications interface 14 generally will be a digital interface complying with the well known RS 232 serial communications standard, and it will transfer data in response to the commands specified in the published "SECS" communications protocol that is widely adopted in the semiconductor industry. A diagnostic apparatus 10 for monitoring such semiconductor mainframes conventionally can include a general purpose "PC" computer 62 running the well known Windows, Macintosh, or Linux operating system. Alternatively, the diagnostic apparatus 10 can include a computer 62 specifically intended for monitoring semiconductor fabrication tools, such as the "Blue Box" model computer sold by MKS Instruments, a company in Andover, Mass. Either type of computer 62 commonly has an RS-232 serial port 18 that can be connected to the RS-232 port of the UUT via a conventional serial cable. Conventional data collection and analysis software can be installed on the computer. Such software can control data transfer through the communications interfaces of the diagnostic apparatus in compliance with the communications protocol used by the UUT, such as the SECS protocol, so as to retrieve desired attribute data from the UUT. The software also can present the retrieved attribute data to service personnel, store or "log" the data in a conventional computer storage device 60, signal an alert upon detecting the occurrence of certain conditions in the retrieved attribute data, and perform statistical analysis of the data. For example, software with these capabilities is commercially sold by MKS Instruments and by Brookside Software, a company in San Carlos, Calif.

In operation, a human user will instruct the diagnostic apparatus to retrieve certain attribute data from the UUT. The instruction may be in the form of a manually typed command, a push button, or a computer program stored by a user in the diagnostic apparatus that specifies a sequence in which several attributes should be retrieved in accordance with a data collection plan. These are all conventional features of the aforesaid, commercially available, data collection software and computer hardware.

To implement our invention, the attribute database described above can be added to one of the just-described conventional diagnostic apparatuses 10 that is based on a programmable computer 62.

The attribute database records can be stored on any conventional data storage device 60, such as one or more computer hard disk drives. The logical structure of the attribute database, in the form of the records and fields described in this patent specification, can be implemented by straightforward programming of any conventional database management system (DBMS) software installed on a conventional computer 62. DBMS software is commercially sold by various software companies such as Microsoft, IBM and Oracle. Open source SQL DBMS software also is publicly available. Of course, the data storage device can be connected to the computer by any conventional data interface.

That attribute database and the DBMS software can be installed on the data storage device 60 and the computer 62 within the diagnostic apparatus 10 shown in FIG. 1. Both the DBMS software and the previously described data collection and analysis software can be installed and simultaneously running on the same computer 62.

Figure 5:
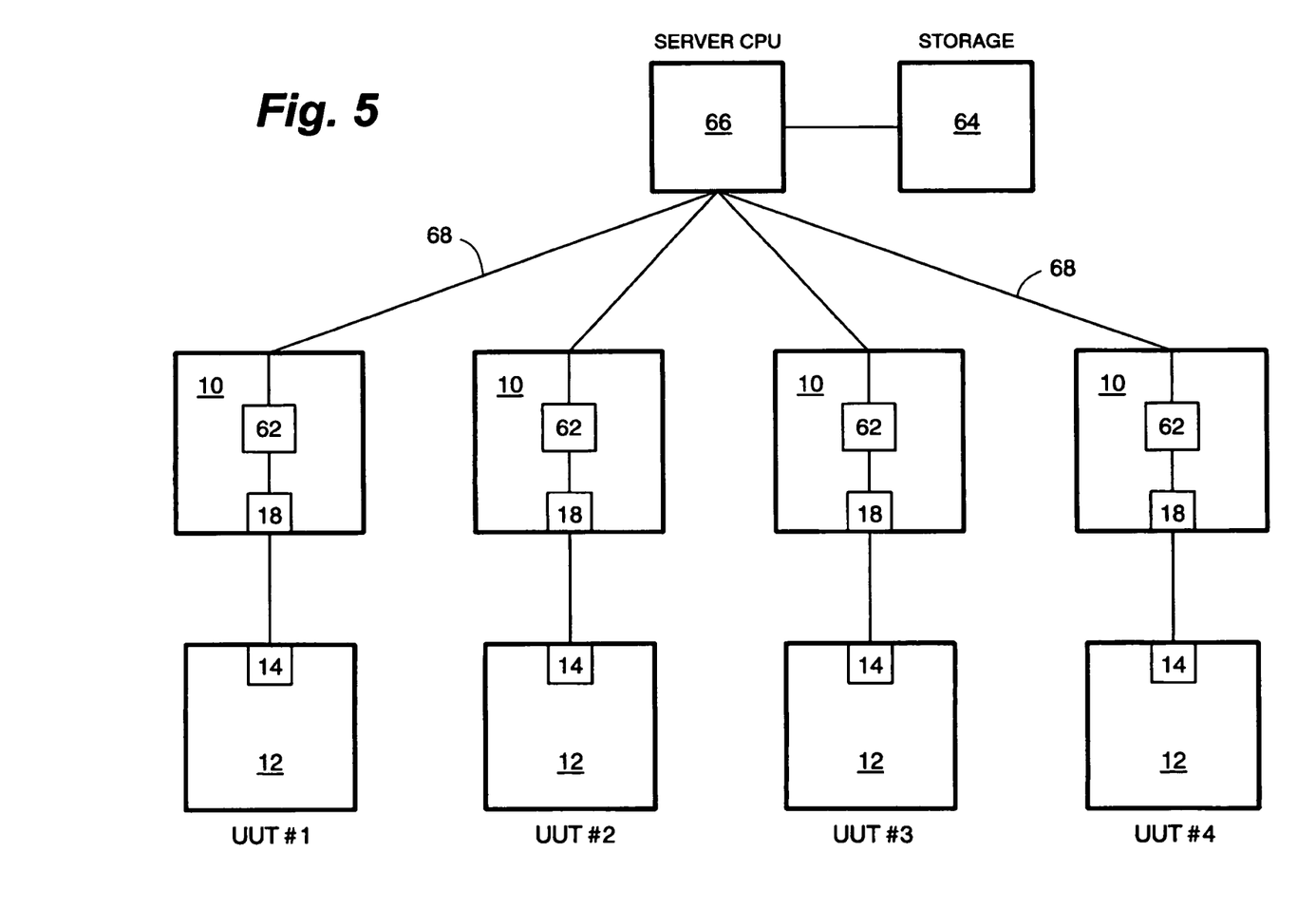
FIG. 5 is a schematic diagram of a system in which the attribute database is remote from the diagnostic apparatus.

More preferably, as shown in FIG. 5, the attribute database and the DBMS software can be installed on a data storage device 64 and a server computer 66 at a remote location. The diagnostic apparatus 10 can connect to the server computer 66 via a conventional data communications link 68, such as a local area network, a wide area network, or a point-to-point link via telephone. The DBMS software installed on the server computer 66 preferably has multi-user server capability so that many diagnostic apparatuses 10 at different locations can simultaneously access the database.

For example, the data storage device 64 on which the attribute database is installed can be located at a central office where it can be readily updated from time to time to include new models and new versions of UUT'S. Portable diagnostic apparatuses 10 can be carried to customer sites throughout the world to service customer-owned UUT's. Each diagnostic apparatus can access the database via a communications link 68.

If the attribute database is installed on a remotely located 64 and server computer 66 as shown in FIG. 5, then each diagnostic apparatus 10 should include a computer 62 in which conventional database client software has been installed. Such software is conventionally capable of sending a request via the communications link 68 to the server computer 66 whenever the diagnostic apparatus needs to retrieve a database record, such as to determine the ID or other properties of an attribute. The computer 62 within each diagnostic apparatus 10 also should include the previously described conventional software for communicating with the UUT to retrieve attribute data.

Operation

Before the diagnostic apparatus is used to retrieve attribute data from a given class (model and version) of UUT, the previously described attribute records (FIG. 2) which characterize the diagnostic attributes for that class of UUT should be stored in the attribute database. Generally, the manufacturer of the UUT supplies the ID and other properties of each diagnostic attribute that the UUT is capable of transmitting. Therefore, the user of the diagnostic apparatus can acquire such attribute properties from the UUT manufacturer and store the information in the attribute database in accordance with the database structure described above. Preferably, the manufacturer of the UUT can store the information directly in the database (i.e., build or populate the database) to avoid the need for the user to acquire the information from the manufacturer and reformat it for storage in the database.

Figure 6:
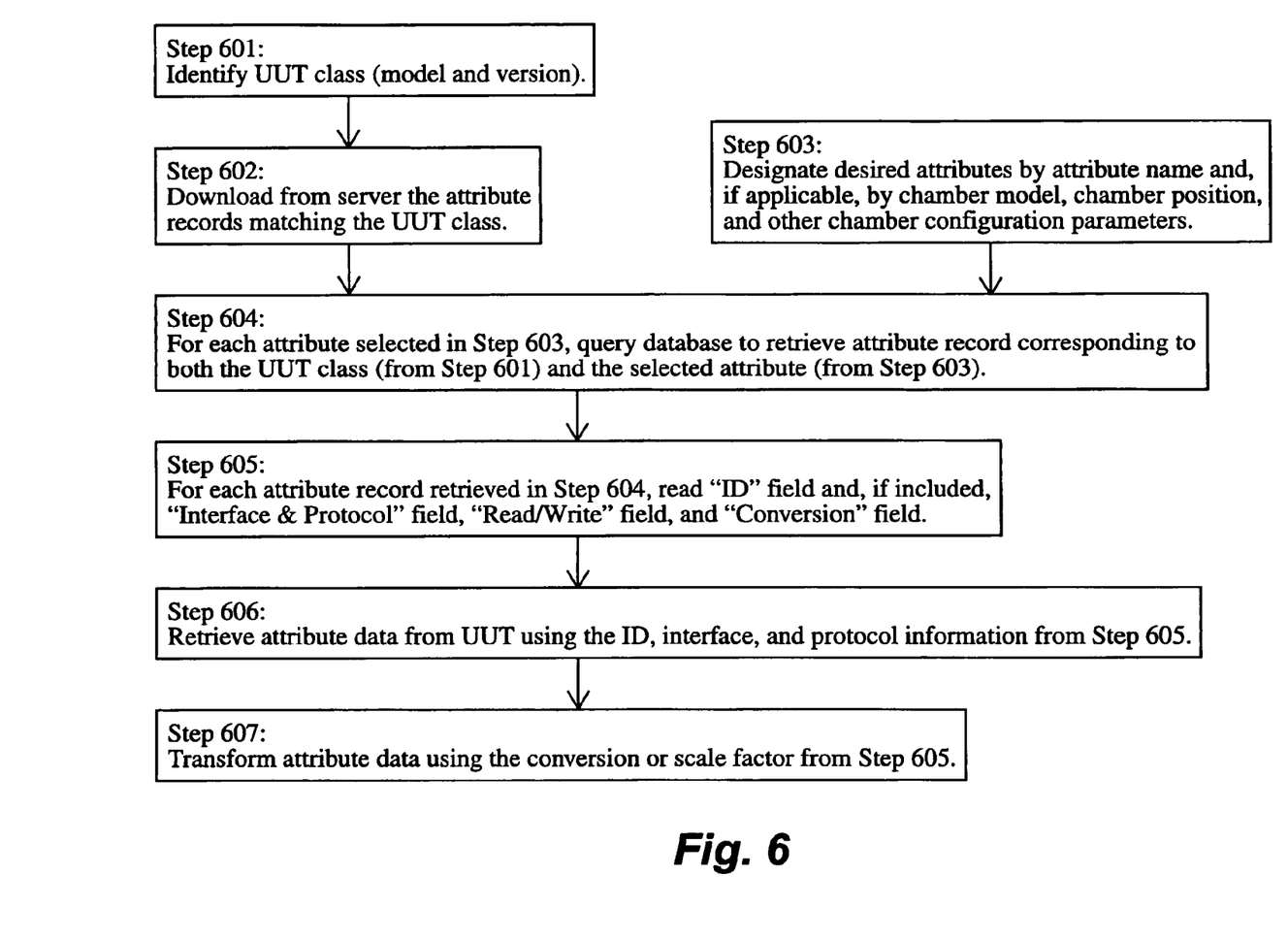
FIG. 6 is a flow chart showing the steps by which the diagnostic apparatus retrieves attribute data from a UUT using information stored in the attribute database.

FIG. 6 is a flow chart showing the steps by which a diagnostic apparatus 10 retrieves attribute data from a UUT using the previously described attribute database. These steps preferably are implemented by straightforward programming of the computer 62 within the diagnostic apparatus. The software that implements the following Steps 601-607 is referred to herein as the Attribute Look-Up software. The Attribute Look-Up software preferably is installed in the same computer 62 within the diagnostic apparatus 10 that runs the conventional data collection and analysis software described under the heading "Hardware Implementation". All of this software can run simultaneously on the computer.

Step 601: The diagnostic apparatus must identify what class (model and version) of UUT it is connected to. Some conventional UUT's are capable of identifying themselves in response to a command sent by the diagnostic apparatus to a digital communications interface 14 of the UUT. With UUT's that lack such capability, the person using the diagnostic apparatus is responsible for identifying the UUT and providing this information to the diagnostic apparatus, such as via keyboard input. As explained in the preceding sections entitled "Attribute Database" and "UUT Class Field," the information required to uniquely identify a class of UUT includes a model designation, and a version designation (e.g., version number or version date) may be necessary to uniquely identify the class of UUT if different versions have different attribute properties.

Step 602: Optionally, if the attribute database is stored on a remote server 66, the diagnostic apparatus can transfer from the server's storage device 64 to its local storage device 60 a copy of all the attribute records for the identified class of UUT, that is, all attribute records whose "UUT Class" field matches the class of UUT identified in Step 601. This optional Step 602 eliminates the need to maintain a continuous communications link 68 with the remote server during subsequent operation of the diagnostic apparatus, since the communications link is required only during this Step 602. This step is accomplished by a database client software on the local computer 62 sending a query to DBMS server software on the server computer 66.

Step 603: The diagnostic apparatus must identify one or more attributes that service personnel select to retrieve from the UUT. The selected attributes may be manually identified by keyboard input, or may be specified in a data collection plan that service personnel previously stored in the computer of the diagnostic apparatus. This step may be performed before, after, or concurrently with Step 601. For attributes that are associated with a chamber attached to a multi chamber UUT, the identification of the attribute should include identifying the chamber model, chamber position, and any other applicable chamber configuration parameters, as explained in the preceding section entitled "Attribute Field."

Step 604: For each attribute selected in Step 603, the diagnostic apparatus queries the attribute database to retrieve the one attribute record corresponding to both the UUT class identified in Step 601 and the selected attribute. If optional Step 602 was performed, the diagnostic apparatus can search the attribute records transferred to its local storage device in Step 602 to find the one attribute record whose "Attribute" field matches the selected attribute. Otherwise, conventional database client software on the local computer 62 should send a query to DBMS server software on the server computer 66 to retrieve the one attribute record whose "UUT Class" field matches the UUT class identified in Step 601 and whose "Attribute" field matches the selected attribute.

Step 605: For each attribute record retrieved in Step 604, the diagnostic apparatus reads the ID of that attribute from the "ID" field of the record. If such fields are included in the attribute record, the diagnostic apparatus also reads the interface and protocol information from the "Interface & Protocol" field of the record, and reads the read/write flag from the "Read/Write" field of the record.

Step 606: The diagnostic apparatus now retrieves the actual attribute data from the external communications interface of the UUT using the ID, the interface information, and the protocol information from Step 605. If the UUT and its associated data sources collectively have more than one external communications interface, the interface information specifies from which interface the diagnostic apparatus should retrieve the attribute data in this step. The protocol information specifies the retrieval method required by the UUT; it typically will be one of the methods described in the preceding sections entitled "Conventional UUT and Diagnostic Apparatus" and "Interface & Protocol Field".

For example, if the UUT 12 employs a command-driven protocol for outputting that attribute data, the diagnostic apparatus sends to the UUT a "read" command specifying the ID. As another example, if the UUT transmits the attribute data in a continuous streaming protocol as described above, the diagnostic apparatus 10 uses the ID of the desired attribute to locate the attribute data in the stream of data from the UUT. Alternatively, if the UUT outputs the specified attribute at an analog interface, the diagnostic apparatus simply reads the analog signal from the interface specified in the "Interface & Protocol" field. If the interface has multiple signal lines, the "ID" field should specify from which signal line of the interface the diagnostic apparatus should read the analog signal.

Preferably, the computer 62 of the diagnostic apparatus includes conventional data collection software as described under the heading "Hardware Implementation". If so, in Step 606 the Attribute Look-Up software preferably passes the ID, the interface information, and the protocol information obtained in Step 605 to the data collection software, which employs the specified communications protocol to retrieve the attribute data from the UUT.

Step 607: If the attribute record includes a "Conversion" field or "Scale Factor" field value, apply the conversion or scale factor specified in the attribute record. If the attribute record includes a "Physical Units" field value, store that value along with the attribute data. These fields are explained below under the heading "Conversion to Physical Units."

Conversion to Physical Units

Each database record can further include a "Conversion" field that contains one or more subordinate fields, each of which stores a conversion parameter, such as a scale factor, for converting the analog or digital electrical signal outputted by the UUT to a physical unit of measurement for the attribute value identified by the "Attribute" field. An additional subordinate field of the "Conversion" field can specify the units of such physical unit of measurement, such as "watts", "degrees Celsius", "torr", or "sccm".

In many models of mainframes commercially sold by the assignee of this invention, the attribute data outputted by the mainframe is an N-bit binary number whose possible values range from zero to 2N-1, where the binary values of zero and 2N-1 respectively represent a minimum physical value and a maximum physical value for the attribute. For such attributes, the "Conversion" field preferably consists of three subordinate fields: "Min", "Max" and "Units". The numerical values stored in the "Min" and "Max" fields are the physical attribute values represented by the attribute data having binary values of zero and 2N-1, respectively. The value stored in the "Units" field designates the physical units in which such physical attribute values are expressed.

For example, suppose that one of the attributes outputted by a mainframe is the temperature of the susceptor in the third chamber, and suppose that the range temperature measurements is 50° C. to 550° C. Accordingly, the mainframe should output binary values in the range of zero to 2N-1 to represent temperatures in the range of 50° C. to 550° C. In that case, values of "50" and "550" should be stored in the "Min" and "Max" fields, respectively, of the database record for the temperature of the susceptor in the third chamber, and the value "degrees Celsius" should be stored in the "Units" field of that record.

Version Ranges

As described in the preceding sections entitled "Attribute Database" and "UUT Class Field," the "UUT Class" field of each database record identifies the class of equipment to which the remaining fields in the record pertain. In general, the class of UUT can be defined by the equipment model, equipment version, or a combination of both. That is, the classes of UUT's may include various equipment models, and each model of UUT may be produced in various versions or generations having some differences in the specifications of their attributes. To enable the database to record the differences among various models of UUT's as well as various versions or generations of each model, the "UUT Class" field of each database record is a combination field that includes a "Model" subordinate field and a "Version" subordinate field. In other words, each version of each model of mainframe equipment is considered a distinct UUT Class.

The value stored in the "Version" field to identify a version or generation may be, for example, a version number or a version date. The versions of a given model of UUT may differ from each other in either their physical features or their operating software. If the versions differ from each other in what diagnostic attributes the UUT outputs via its external communications interface, or in the properties of the transmitted attributes (e.g., the respective ID's or conversion factors associated with one or more attributes), then it would be useful to employ the attribute database of the present invention to track these differences.

The attribute database of the present invention is useful to tabulate differences between versions even when a diagnostic apparatus will only be connected to a single model of UUT equipment. In that case, there would be no need for the "Model" sub-field of the "UUT Class" field. In other words, the "UUT Class" field would simply be the "Version" field.

Returning to the more general case in which the UUT Class is defined by both model and version, in one embodiment the attribute database contains a distinct set of records for each UUT class, and the set of records for a given UUT class includes a distinct record for each diagnostic attribute that can be outputted by that model and version of the UUT. For example, if a given model of mainframe equipment has undergone 20 versions of software and/or hardware changes during its history, and if each version of that model has 30 attributes, then the database will require 600 records (20 versions multiplied by 30 attributes per version) to store the specifications of the attributes for all versions of that model.

A more preferable embodiment of the attribute database reduces the required number of records by enabling the "Version" field of each attribute record to represent a range of versions instead of just a single version. Specifically, if the interface specifications and other properties of a given diagnostic attribute remain the same for a range of versions of a given model of UUT, a single record is stored in the database to characterize that diagnostic attribute for all the versions within that range, rather than storing a distinct record for each version.

Figure 3:
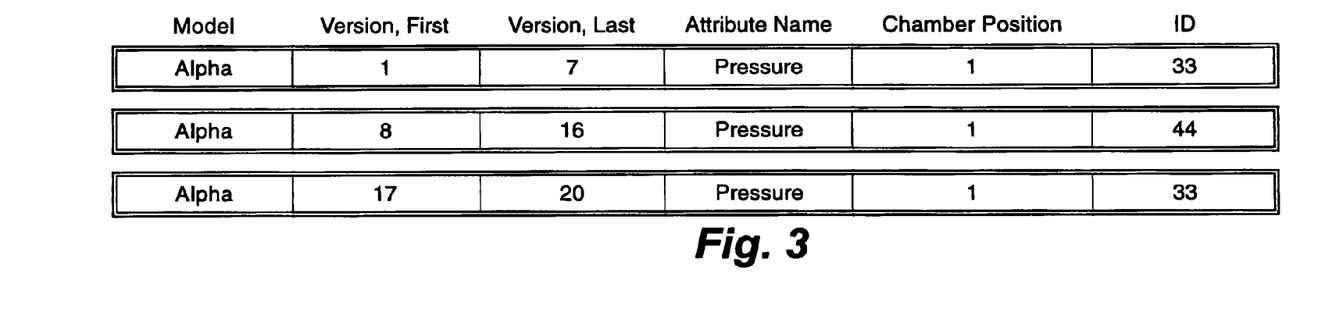
FIG. 3 is a schematic diagram of the values stored in three attribute records which represent an exemplary attribute whose ID changes in different versions of an exemplary model of UUT.

FIG. 3 shows the implementation of this technique in which the "Version" field in each database record is a compound field that includes two subordinate fields called "Version, First" and "Version, Last" whose contents respectively identify the first and last versions of the UUT model identified in the "Model" field to which the remaining fields of the record apply. In this embodiment of the invention, we define a "UUT Class" as a range of one or more versions of a specific model of UUT.

For example, suppose a mainframe model called "Alpha" has undergone 20 revisions during its history. Suppose that in versions 1-7 of the Alpha mainframe, the attribute "Pressure in Chamber 1" was assigned to logical port 33; in versions 8-16, this attribute was assigned a new logical port of 44; and in versions 17-20, this attribute was assigned to logical port 33 again. As shown in FIG. 3, these revisions can be represented by three database records instead of twenty.

Figure 4:
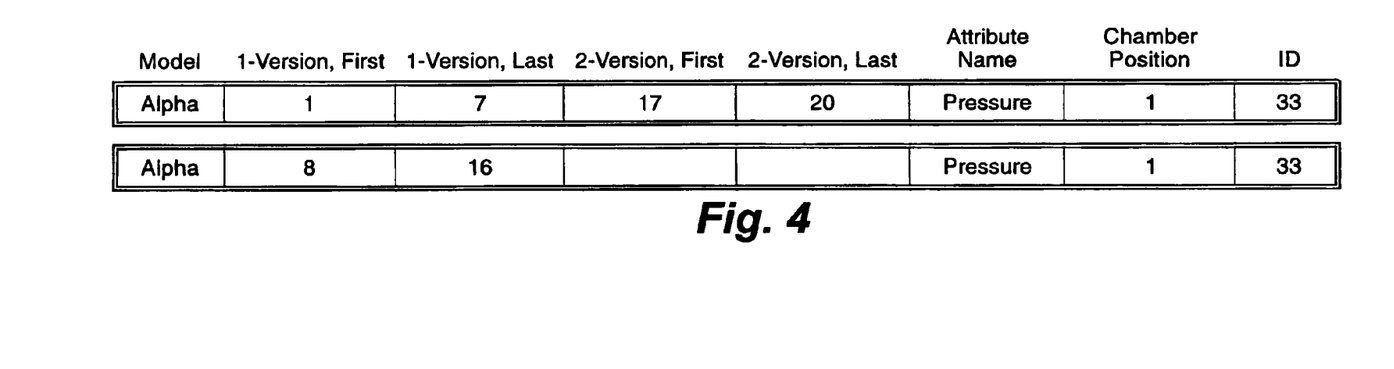
FIG. 4 is a schematic diagram of two attribute records which can represent the same information as the three records of FIG. 3.

FIG. 4 shows an alternative embodiment in which the "Version" field can specify a plurality of versions that are not contiguous, and hence that cannot be defined as a range bounded by a first version and a last version. In this embodiment, the "Version" field can include any number of subordinate fields that each identify a version of the UUT model to which the record applies, so that the subordinate fields collectively identify a set of UUT versions. In the example of the preceding paragraph, the attribute "Pressure in Chamber 1" of Alpha can be represented by only two records in the database: one record for versions 1-7 and 18-20, and a second record for versions 8-17, as shown in FIG. 4. The first database record has a "Version" field consisting of four subordinate fields called "1-Version, First", "1-Version, Last", "2-Version, First" and "2-Version, Last" in which are stored the respective values "1", "7", "17" and "20".

Although versions conventionally are identified by version numbers, non-numeric names also can be used to identify different versions.

Alternatively, versions can be identified by date rather than version number. For example, in the embodiment shown in FIG. 2, the "Version" field of an attribute data record could store the release date, rather than a version number, of the UUT class to which that attribute data record applies. Similarly, in the embodiment shown in FIG. 3, the "Version, First" and "Version, Last" fields could store the first production date and the last production date of the UUT class to which the record applies, signifying that the attribute data record applies to all equipments of that UUT class that were produced between the specified first and last production dates.

Database Normalization

Figure 7:
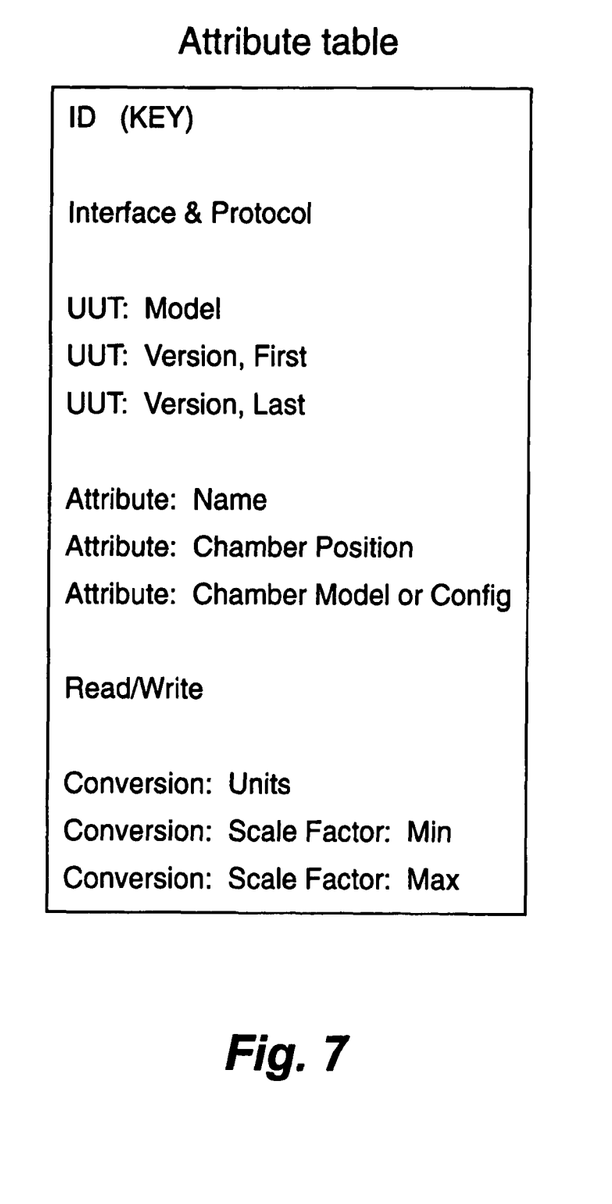
FIG. 7 is a database table representing the attribute database having the fields shown in FIG. 2.

FIG. 2, discussed extensively above, depicts the fields in a record of the attribute database. The identical database structure is depicted in FIG. 7 in the form of a table. In the database tables shown in FIGS. 7 and 8, the notation "A:B" for a field name represents the sub-field named "B" of the compound field named "A".

Figure 8:
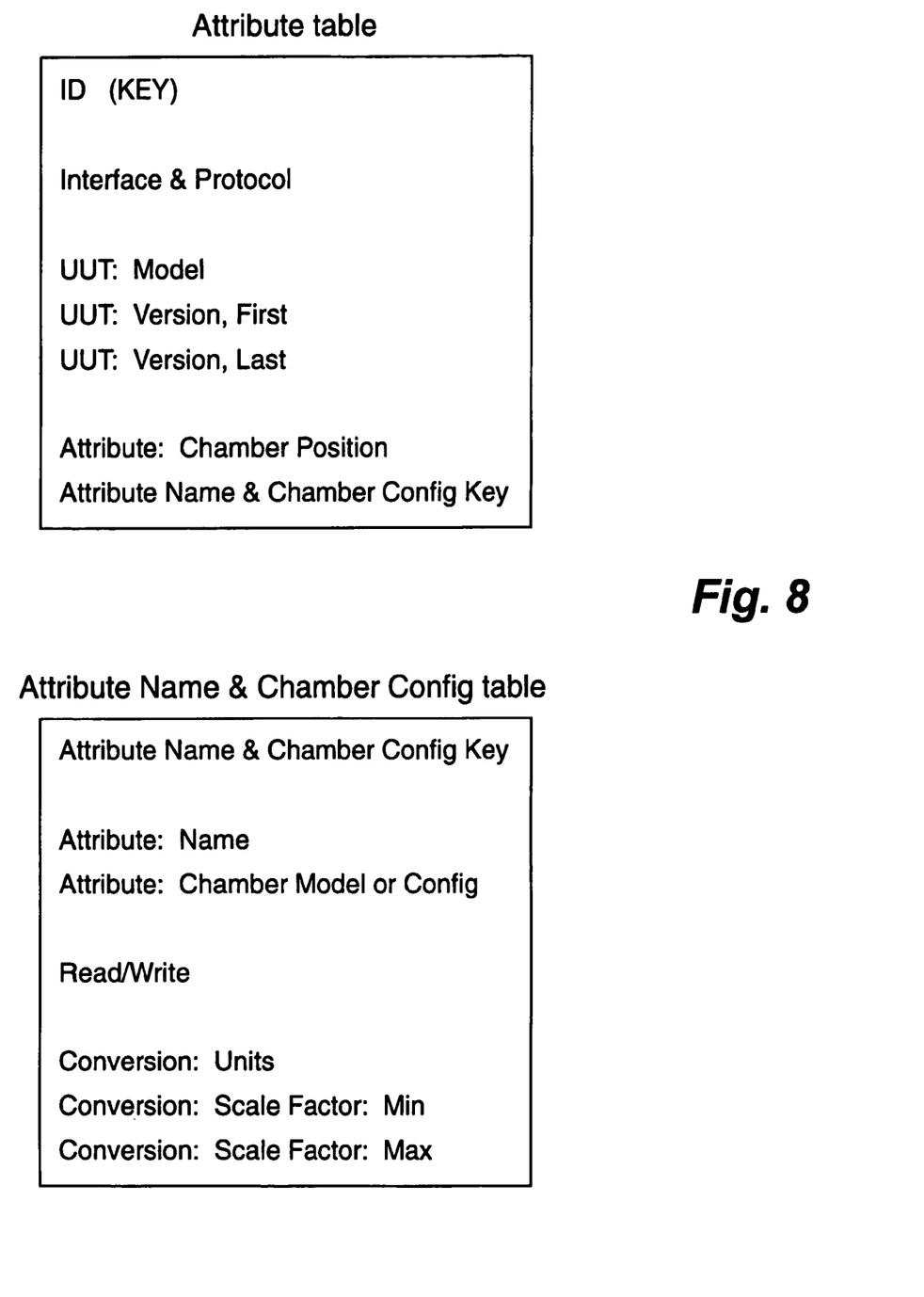
FIG. 8 is a database table showing the database of FIG. 7 divided into two tables.

FIG. 8 shows how the database can be at least partially normalized by dividing it into two tables called the "Attribute" table and the "Attribute Name & Chamber Config" table. To normalize the database, fields whose values rarely or never change independently of each other are grouped into a table. The normalized database reduces storage requirements by eliminating redundant fields in the records of the main database table, the Attribute table.

In each database table, the first field listed is the key field of the table, which means that every record of the table has a different value stored in the key field. In the Attribute table, the ID is the key field because every attribute has a different ID.

Diagnostic attributes that represent operating conditions or measurements for a process chamber, as opposed to the mainframe, usually are converted from analog measurements into digital attribute data using analog-to-digital converters within the chamber or within the measurement instrument attached to the chamber. Consequently, the conversion parameters (units and scale factor), as well as whether a parameter is read-only or read/write, usually are determined entirely by the chamber model and chamber configuration and are independent of the model and version of the UUT to which the chamber is connected. Logically, the conversion parameters also are independent of the chamber position on the mainframe at which a given process chamber is mounted. Therefore, the database fields that represent the conversion parameters and the read/write flag can be moved from the Attribute table to a "child" table.

Besides the conversion parameters and read/write flag, the additional fields included in the "child" table are the fields necessary to uniquely determine the values of the conversion parameters and the read/write flag. These additional fields are, for the reasons explained in the preceding paragraph, the "Attribute: Name" field and the "Attribute: Chamber Model or Config" field. These two fields collectively define the key field of the database table. Therefore, the child table is named the "Attribute Name & Chamber Config" table. The value stored in the key field for each record of the table can be either an arbitrary index number or can be formed by concatenating the values of the "Attribute: Name" field and the "Attribute: Chamber Model or Config" field for that record.

The advantage of creating the "Attribute Name & Chamber Config" table is that Attribute table now only needs to include a single field for the "Attribute Name & Chamber Config Key" in place of the six fields previously required for the "Attribute: Name", "Attribute: Chamber Model or Config", "Read/Write", "Conversion: Units", "Conversion: Scale Factor: Min", and "Conversion: Scale Factor: Max". This reduces the storage required for the database.

What is claimed is:

1. A method of testing semiconductor processing equipment by a diagnostic apparatus, comprising:
    detecting a connection to a mainframe of the semiconductor processing equipment, the mainframe providing a communication interface to one or more processing chambers physically coupled to the mainframe, wherein the one or more processing chambers perform semiconductor fabrication processes;
    determining, with the diagnostic apparatus, an equipment class of the mainframe of the semiconductor processing equipment, the equipment class identifying a mainframe model designation and version of the mainframe, wherein the mainframe model designation identifies an individual equipment model and the version identifies a specific version of the equipment model specified in the mainframe model designation;
    retrieving one or more attribute records matching the equipment class of the mainframe of the semiconductor processing equipment from an attribute database;
    receiving a selection of one or more attributes included in the retrieved records, wherein each attribute is associated with a sensor measurement or an operating parameter of the one or more processing chambers;
    for each selected attribute, identifying a conversion factor and an identifier from the retrieved attribute record uniquely determined by the equipment class of the mainframe, the selected attribute, and at least one of a chamber position or a chamber model designation of the one or more processing chambers;
    retrieving, from the mainframe, attribute data that the mainframe associates with the identifier; and
    transforming the attribute data into a physical unit of measurement using the conversion factor included in the attribute record, wherein the attribute record includes a first field identifying the equipment class, a second field identifying the attribute, and a third field specifying the identifier, wherein the version of the mainframe includes a version field having sub-fields that enable the version field to identify a range of versions of the equipment model.

2. The method of claim 1, further comprising:
    retrieving attribute data from the mainframe using the first field, the second field and the third field of the attribute record.

3. The method of claim 1, further comprising:
    retrieving from the attribute database a subordinate record associated with the attribute record, the subordinate record having one or more subordinate fields that are subordinate to the second field of the attribute record.

4. The method of claim 3, wherein the one or more subordinate fields include an attribute name field, an attribute chamber model field, a units conversion field, a minimum scale factor conversion field and a maximum scale factor conversion field.

5. The method of claim 1, wherein determining, with the diagnostic apparatus, the equipment class of the mainframe includes receiving a user selection of the equipment class, further comprising:
    displaying a first view of a graphical user interface that includes a list of user selectable equipment classes; and
    upon receiving user selection of the equipment class, displaying a second view of the graphical user interface that includes a list of user selectable attributes associated with the equipment class and at least one of the chamber position and the chamber model.

6. The method of claim 1, wherein the diagnostic apparatus is a portable diagnostic apparatus that includes the attribute database.

7. A non-transitory computer readable medium including instructions that, when executed by a computer, cause the computer to perform a method of testing semiconductor processing equipment by a diagnostic apparatus, comprising:
    detecting a connection to a mainframe of the semiconductor processing equipment, the mainframe providing a communication interface to one or more processing chambers physically coupled to the mainframe, wherein the one or more processing chambers perform semiconductor fabrication processes;
    determining, with the diagnostic apparatus, an equipment class of the mainframe of the semiconductor processing equipment, the equipment class identifying a mainframe model designation and version of the mainframe, wherein the mainframe model designation identifies an individual equipment model and the version identifies a specific version of the equipment model specified in the mainframe model designation;
    retrieving one or more attribute records matching the equipment class of the mainframe of the semiconductor processing equipment from an attribute database;

receiving a selection of one or more attributes included in the retrieved records, wherein each attribute is associated with a sensor measurement or an operating parameter of the one or more processing chambers;

for each selected attribute, identifying a conversion factor and an identifier from the retrieved attribute record uniquely determined by the equipment class of the mainframe, the selected attribute, and at least one of a chamber position or a chamber model designation of the one or more processing chambers;

retrieving, from the mainframe, attribute data that the mainframe associates with the identifier; and transforming the attribute data into a physical unit of measurement using the conversion factor included in the attribute record, wherein the attribute record includes a first field identifying the equipment class, a second field identifying the attribute, and a third field specifying the identifier, wherein the version of the mainframe includes a version field having sub-fields that enable the version field to identify a range of versions of the equipment model.

8. The non-transitory computer readable medium of claim 7, the method further comprising:

retrieving attribute data from the mainframe using the first field, the second field and the third field of the attribute record.

9. The non-transitory computer readable medium of claim 7, the method further comprising:

retrieving from the attribute database a subordinate record associated with the attribute record, the subordinate record having one or more subordinate fields that are subordinate to the second field of the attribute record.

10. The non-transitory computer readable medium of claim 9, wherein the one or more subordinate fields include an attribute name field, an attribute chamber model field, a units conversion field, a minimum scale factor conversion field and a maximum scale factor conversion field.

11. The non-transitory computer readable medium of claim 7, wherein determining the equipment class of the mainframe includes receiving a user selection of the equipment class, further comprising:

displaying a first view of a graphical user interface that includes a list of user selectable equipment classes; and upon receiving user selection of the equipment class, displaying a second view of the graphical user interface that includes a list of user selectable attributes associated with the equipment class and at least one of the chamber position and the chamber model.

12. The non-transitory computer readable medium of claim 7, wherein the diagnostic apparatus is a portable diagnostic apparatus that includes the attribute database.

13. A diagnostic apparatus comprising:

a digital communications interface and an analog communications interface to connect with a mainframe of a semiconductor processing equipment, the mainframe providing a communication interface to one or more processing chambers physically coupled to the mainframe, wherein the one or more processing chambers perform semiconductor fabrication processes;

an attribute database to store a plurality of attribute records, one or more of the plurality of attribute records including an equipment class identifying a mainframe model designation and version, an attribute associated with a conversion factor and the equipment class, and an identifier uniquely determined by the equipment class, the attribute, and at least one of a chamber position or a chamber model designation of the one or more processing chambers, wherein each attribute is a sensor measurement or an operating parameter of the one or more processing, wherein the mainframe model designation identifies an individual equipment model and the version identifies a specific version of the equipment model specified in the mainframe model designation;

an attribute lookup module, coupled with the digital communications interface and the attribute database, to determine an equipment class of the mainframe, to receive a selection of an attribute associated with the equipment class, the selection including a selection of at least one of a chamber position or a chamber model, and to retrieve an attribute record associated with the equipment class, the selected attribute, and at least one of the chamber model and chamber position, in the attribute database; and a data collector to retrieve, from the mainframe, attribute data via the digital communications interface or the analog communications interface using the identifier from the retrieved attribute record, and to transform the attribute data into physical units of measurement using the conversion factor included in the attribute record, wherein the attribute record includes a first field identifying the equipment class, a second field identifying the attribute, and a third field specifying the identifier, wherein the version of the mainframe includes a version field having sub-fields that enable the version field to identify a range of versions of the equipment model.

14. The diagnostic apparatus of claim 13, wherein:

the attribute database to store a plurality of subordinate records, each of the plurality of subordinate records being associated with one or more of the plurality of attribute records, and each of the plurality of subordinate records having one or more fields that are subordinate to a field of the one or more of the plurality of attribute records; and the attribute lookup module is further to retrieve from the attribute database a subordinate record associated with the equipment class and the selected attribute in the attribute database.

15. The diagnostic apparatus of claim 14, wherein the one or more subordinate fields include an attribute name field, an attribute chamber model field, a units conversion field, a minimum scale factor conversion field and a maximum scale factor conversion field.

16. The diagnostic apparatus of claim 13, further comprising:

a graphical user interface to display a list of user selectable attributes associated with the equipment class, and upon receiving user selection of the equipment class, to display a list of user selectable attributes associated with the equipment class and at least one of the chamber position and the chamber model.

17. The diagnostic apparatus of claim 13, wherein the diagnostic apparatus is a portable diagnostic apparatus.

18. A method of testing semiconductor processing equipment by a diagnostic apparatus, comprising:

detecting a connection to a mainframe of the semiconductor processing equipment, the mainframe providing a communication interface to one or more processing chambers physically coupled to the mainframe, the communication interface including at least one data port coupled to each of the processing chamber and to a communications channel managed by a processor of the mainframe, wherein the one or more processing chambers perform semiconductor fabrication processes;

determining, with the diagnostic apparatus, an equipment class of the mainframe of the semiconductor processing equipment, the equipment class including a model and version of the mainframe, wherein the model identifies an individual equipment model and the version identifies a specific version of the equipment model specified in the model;

retrieving one or more attribute records matching the equipment class of the mainframe from an attribute database;

receiving a selection of one or more attributes comprising a sensor measurement, an operating parameter of the equipment class of the mainframe, or at least one of a chamber position or a chamber model uniquely identifying each of the one or more processing chambers;

for each selected attribute, identifying an attribute record corresponding to the equipment class and the selected attribute, wherein the attribute record includes an identifier associated with the equipment class and the selected attribute; and retrieving, from the mainframe, attribute data that the mainframe associates with the identifier, wherein the attribute record includes a first field identifying the equipment class, a second field identifying the attribute, and a third field specifying the identifier, wherein the version of the mainframe includes a version field having sub-fields that enable the version field to identify a range of versions of the equipment model.

19. The method of claim 18, wherein the one or more processing chambers include a first processing chamber with a class of attributes and a second processing chamber with a different class of attributes, wherein the attribute records include a first model of a mainframe with a class of attributes and a second model of a mainframe with a different class of attributes.

* * * * *